(12) United States Patent
Freedman

(10) Patent No.: US 7,124,082 B2
(45) Date of Patent: Oct. 17, 2006

(54) PHONETIC SPEECH-TO-TEXT-TO-SPEECH SYSTEM AND METHOD

(75) Inventor: Gordon Freedman, Nepean (CA)

(73) Assignee: Twisted Innovations, Ottawa (CA)

( * ) Notice: Subject to any disclaimer, the term of this patent is extended or adjusted under 35 U.S.C. 154(b) by 882 days.

(21) Appl. No.: 10/268,692

(22) Filed: Oct. 11, 2002

(65) Prior Publication Data

US 2004/0073423 A1 Apr. 15, 2004

(51) Int. Cl.
*G10L 15/26* (2006.01)
*G10L 13/00* (2006.01)

(52) U.S. Cl. ..................... 704/260; 704/235
(58) Field of Classification Search ............. None
See application file for complete search history.

(56) References Cited

U.S. PATENT DOCUMENTS 5,230,037 A * 7/1993 Giustiniani et al. ......... 704/200
6,148,285 A * 11/2000 Busardo ..................... 704/260

* cited by examiner

*Primary Examiner*—Susan McFadden
(74) *Attorney, Agent, or Firm*—Freedman & Associates

(57) ABSTRACT

A speech-to-text-to-speech for use with on-line and real time transmission of speech with a small bandwidth from a source to a destination. A speech is received and broken down to phonemes, which are encoded into series of symbols compatible with communication systems and other than a known symbolic representation of the speech in a known language for being transmitted through communication networks. When received, the series of symbols is decoded to restore the phonemes and for reconstituting a speech according to the phonemes prior to being communicated to a listening party.

21 Claims, 4 Drawing Sheets

Speech to text

Text to speech

PHONETIC SPEECH-TO-TEXT-TO-SPEECH SYSTEM AND METHOD

FIELD OF THE INVENTION

The present invention relates to speech to text systems, and more specifically to speech to text phonetic systems for use with on-line and real time communication systems.

BACKGROUND OF THE INVENTION

A typical way of transforming speech into text is to create and dictate a document, which is then temporarily recorded by a recording apparatus such as a tape recorder. A secretary, a typist, or the like reproduces the dictated contents using a documentation apparatus such as a typewriter, word processor, or the like.

Along with a recent breakthrough in speech recognition technology and improvement in performance of personal computers, a technology for documenting voice input through a microphone connected to a personal computer by recognizing speech within application software running in the personal computer, and displaying the document has been developed. However, it is difficult for a speech recognition system to carry out practical processing within an existing computer, especially a personal computer because the data size of language models becomes enormous.

Inconveniently, such an approach necessitates either training of a computer to respond to a single user having a voice profile that is distinguished through training or a very small recognisable vocabulary. For example, trained systems are excellent for voice speech recognition applications but they fail when another user dictates or when the correct user has a cold or a sore throat. Further, the process takes time and occupies a large amount of disk space since it relies on dictionaries of words and spell and grammar checking to form accurate sentences from dictated speech.

Approaches to speech synthesis rely on text provided in the form of recognisable words. These words are then converted into known pronunciation either through rule application or through a dictionary of pronunciation. For example, one approach to human speech synthesis is known as concatenative. Concatenative synthesis of human speech is based on recording waveform data samples of real human speech of predetermined text. Concatenative speech synthesis then breaks down the pre-recorded original human speech into segments and generates speech utterances by linking these human speech segments to build syllables, words, or phrases. Various approaches to segmenting the recorded original human voice have been used in concatenative speech synthesis. One approach is to break the real human voice down into basic units of contrastive sound. These basic units of contrastive sound are commonly known as phones or phonemes.

Because of the way speech to text and text to speech systems are designed, they function adequately with each other and with text-based processes. Unfortunately, such a design renders both systems cumbersome and overly complex. A simpler speech-to-text and text-to-speech implementation would be highly advantageous.

It would be advantageous to provide with a system that requires reduced bandwidth to support voice communication.

OBJECT OF THE INVENTION

Therefore, it is an object of the present invention to provide with a system that allows for on-line transmission of speech with a small bandwidth from a source to a destination.

SUMMARY OF THE INVENTION

In accordance with a preferred embodiment of the present invention, there is provided a speech-to-text-to-speech system comprising:

a first input port for receiving a speech;

a first processor in communication with the first input port, the first processor for identifying phonemes within the received speech and for encoding the phonemes into series of symbols compatible with communication systems, the series of symbols other than a known symbolic representation of the speech in a known language;

a first output port in connection with the first processor, the first output port for transmitting the series of symbols;

a second input port for receiving the series of symbols;

a second processor in communication with the second input port, the second processor for decoding the series of symbols to restore the phonemes and for reconstituting speech according to the phonemes; and, a second output port for providing a signal indicative of the reconstituted speech, wherein the reconstituted speech is similar to the received speech.

In accordance with another preferred embodiment of the present invention, there is provided a method of transmitting a speech on-line comprising the steps of:

providing speech;

identifying phonemes within the received speech;

encoding the phonemes into series of symbols compatible with a communication system, the series of symbols other than a known symbolic representation of the speech in a known language;

transmitting the series of symbols via a communication medium;

receiving the series of symbols;

decoding the series of symbols to provide a signal representative of the speech and including data reflective of the phonemes reconstituted to form reconstituted speech similar to the received speech.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
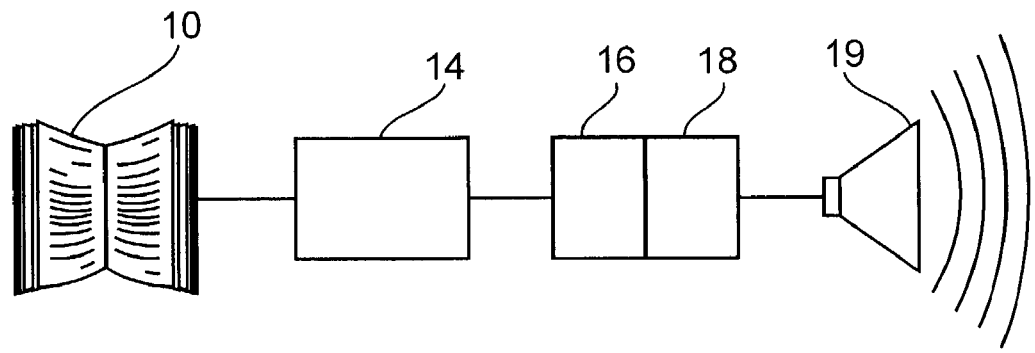
FIG. 1 is a bloc diagram of a prior art text-to-speech system.

Referring to FIG. 1, a bloc diagram of a prior art text-to-speech system 10 is shown. Text 12 is provided via an input device in the form of a computer having a word processor, a printer, a keyboard and so forth, to a processor 14 such that the text is analysed using for example a dictionary to translate the text using a phonetic translation. The processor 14 specifies the correct pronunciation of the incoming text by converting it into a sequence of phonemes. A pre-processing of the symbols, numbers, abbreviations, etc, is performed such that the text is first normalized and then converted to its phonetic representation by applying for example a lexicon table look-up. Alternatively, morphological analysis, letter-to-sound rules, etc. are used to convert the text to speech.

The phoneme sequence derived from the original text is transmitted to acoustic processor 16 to convert the phoneme sequence into various synthesizer controls, which specify the acoustic parameters of corresponding output speech. Optionally, the acoustic processor calculates controls for parameters such as prosody—i.e. pitch contours and phoneme duration—voicing source—e.g. voiced or noise—transitional segmentation—e.g. formants, amplitude envelopes—and/or voice colour—e.g. timbre variations—.

A speech synthesizer 18 receives as input the control parameters from the acoustic processor. The speech synthesizer converts the control parameters of the phoneme sequence derived from the original text into output waveforms representative of the corresponding spoken text. A loudspeaker 19 receives as input the output wave forms from the speech synthesizer 18 and outputs the resulting synthesized speech of the text.

Figure 2:
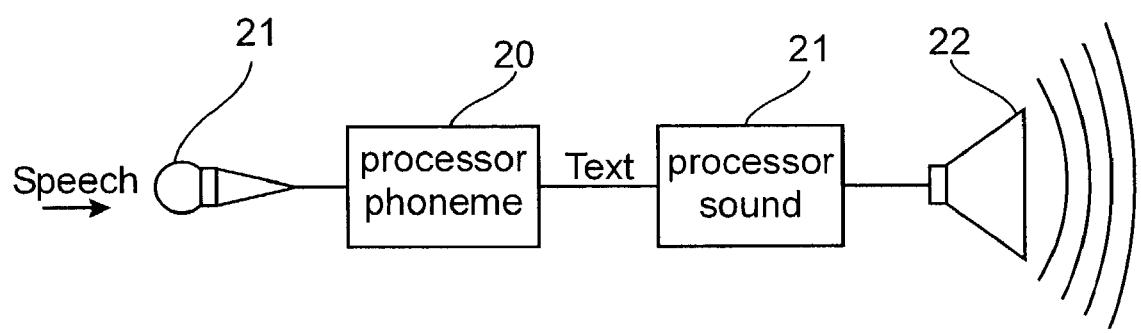
FIG. 2 is a schematic representation of a speech-to-text-to-speech system according to the invention.

Referring to FIG. 2, a schematic representation of a speech-to-text-to-speech system is shown. Speech is provided to a processor 20 through an input device in the form, for example, of a microphone 21. The processor 20 breaks the spoken words down into phonemes and translates the provided speech into a text that corresponds to the speech in a phonetic form. The phonetic text is transmitted via a telecommunication network such as the Internet or a public telephony switching system and is received by device 21 including a processor for restoring the speech according to the phonemes received. The restored speech is then provided to an output port 22 in the form for example of a loudspeaker.

Of course, the speech is provided either in a direct way, i.e. an individual speaks through a microphone connected to the speech-to-text-to-speech system, or using a device such as a tape on which the speech was previously recorded and from which it is read.

Figure 3A:
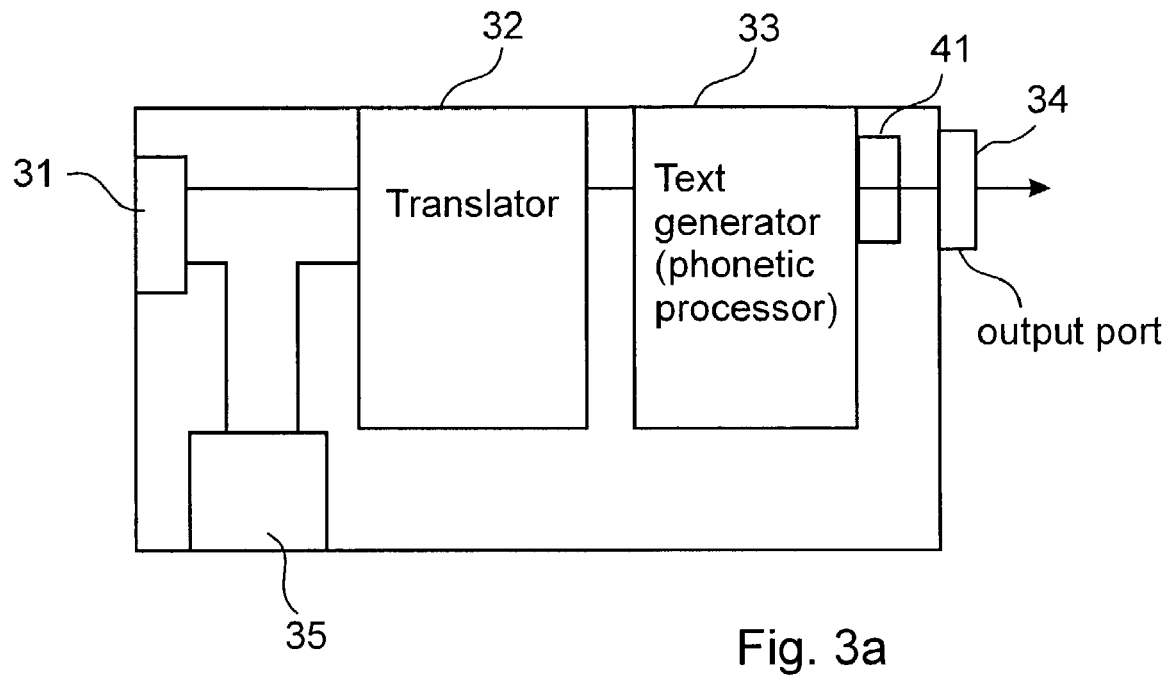
FIG. 3a shows the first part of the speech-to-text-to-speech system, i.e. the speech-to-text portion according to a preferred embodiment of the present invention.
Figure 3B:
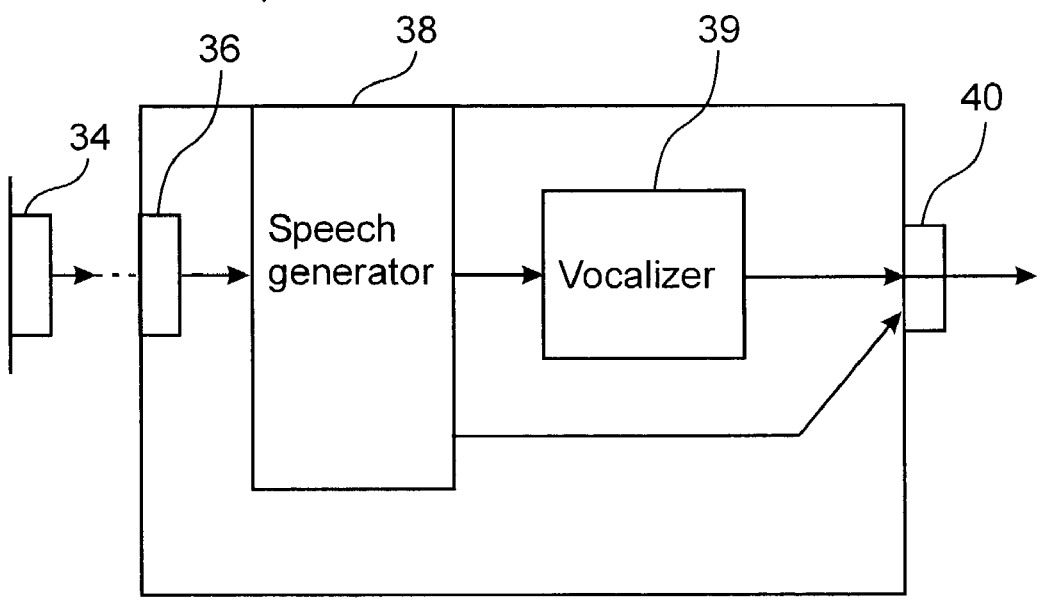
FIG. 3b shows the second part of the speech-to-text-to-speech system, i.e. the text-to-speech portion according to the preferred embodiment of the present invention.

The speech-to-text-to-speech system, according to an embodiment of the present invention is detailed in FIGS. 3a and 3b, wherein FIG. 3a shows the first part of the speech-to-text-to-speech system, i.e. the speech-to-text portion, whereas FIG. 3b shows the second part of the speech-to-text-to-speech system, i.e. the text-to-speech portion.

Referring to FIG. 3a, the speech to text portion of the system is in the form of a device including an input port 31 for receiving a speech to transform, the input port 31 for connecting with the microphone 21 for example. The input port 31 is in communication with a translator 32. The purpose of the translator is to identify the phonemes when a part of a speech is received at input port 31, and to provide the identified phoneme to a text generator 33. The text generator is in the form for example of a phonetic word processor, which transcribes the phonemes into corresponding series of written characters such that a phonetic transcript of the original speech is generated. The phonetic transcript is modified at 41 in order to render it compatible for telecommunication transmission system and communicated to the output port 34 and transmitted out. The modification includes encoding the phonetic characters, the encoding resulting in a series of symbols as for example alphanumeric equivalent or ASCII codes according to look-up tables. The encoding preferably results in a symbolic representation of the speech other than in a known human intelligible language.

Optionally, the table is transmitted along with the message such that, upon reception of the message, the decoding of the message is performed using the same look-up table, which enhances the similarities between the generated speech and the provided speech.

For example, in operation, the sentence: "hello, the sun is shining" is a sentence provided as speech; it is received at the input port and processed by the speech-to-text portion of the system. The translator identifies the following phonemes:

hə'leʊðɪsʌnɪz'ʃaɪnɪŋ, which does not indicate the punctuation nor the word partitions. Of course, the phonemes may include silent phonemes to indicate pauses such as are common between words or at the end of sentences.

This resulting series of phonetic characters corresponds to the original sentence. Advantageously, such phonetic language already incorporates indication regarding a way of speaking of the individual providing the speech such as an accent, a tempo, a rhythm, etc. Some phonetic characters are different when a phoneme is spoken with a tonic accent.

Optionally, the system also includes a sound analyzer 35 for providing value indicative of vocal parameters as for example high/low, fast/slow, or tonic/not tonic when a phonetic character does not already exist.

An example added values is a "1" associated with a phoneme when it is in a high pitch and a "0" for lower frequency relatively to a preset medium frequency. A further associated "1" indicates a fast and a "0" a slow pronunciation speed relatively to a preset medium speed.

Of course, it is possible that each of these parameters is associated with the phoneme. Alternatively, only one or a combination of parameters is associated with a phoneme.

Referring back to the exemplary sentence, if it is pronounced such that the word "hello" is accentuated on the first syllabus, and the second one is accentuated and long or slowly pronounced. The characterization of the word incorporates the vocal flexibility and the resulting translated word according to the encoding example is:

| hə | 'lə |
|----|-----|
| 1  | 10  |

Of course, many other ways of pronouncing the word "hello" exist as for example skipping the beginning "h", or transforming the syllabus "he" to sound more like "hu".

Regardless of the pronunciation style, the translator transforms the signal that is received without attempting to identify the word and providing a "restored" phonetic translation.

Referring to FIG. 3b, the encoded transmitted text is received at input port 36 of the text-to-speech portion of the speech-to-text-to-speech system. The encoded text is transmitted to the speech generator 38 for decoding the text using a look-up table for reconstituting a speech based on the phonetic characters to an output port 40. The output port is in the form for example of a loudspeaker or a headphone when a listening party prefers to listen the speech in a more private environment.

Referring back to our example: The sentence originally spoken is: "hello, the sun is shining".

The resulting phonetic transform, həˈleʊðɪzʌnɪzʃaɪnɪŋ, is encoded and the series of symbols corresponding to the phonemes are transmitted through the output port 34 and received at the input port 36.

The following phrase: "hellothesunisshinning" is reconstituted by the speech generator by performing a reverse operation, i.e. decoding the series of symbols for restoring the phonemes and for delivering the message at the output port 40 to a listening party. A loud voice reading of such a text results in recovering the original broken down speech.

Optionally, the system includes a vocalizer 39, which is in communication with the speech generator and integrates vocal parameters if any were associated with the phonetic characters and provides to the output port sounds reflecting voice inflexion of the individual having spoken the original speech.

Of course, the breakdown of a speech into symbols corresponding to known phonemes for direct transcription into a text typically renders the text unintelligible. In fact such a transcript would look like series of symbols, each symbol corresponding to a phoneme.

Advantageously, in such a system, the text is a transitory step of the process and is preferably not used for editing or publishing purpose for example. Therefore, there is no need of performing an exact transcription of the speech; there is no need of specific application software for comparing a word with a dictionary, for determining grammatical rules and so forth. Consequently, each phoneme is represented with a few bits, which favor a speed of transmission of the text.

An international phonetic alphabet exists, which is preferably used with such a speech-to-text-to-speech system for unifying the system such that the text generator and the speech generator are compatible one with the other.

Figure 4A:
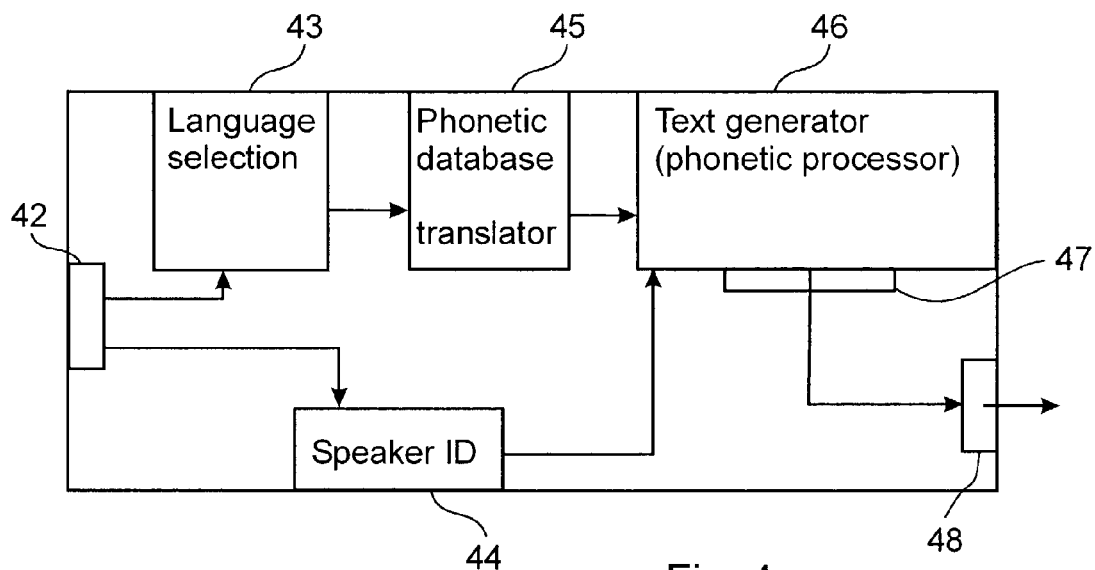
FIG. 4a shows the first part of the speech-to-text-to-speech system, i.e. the speech-to-text portion according to another preferred embodiment of the present invention.
Figure 4B:
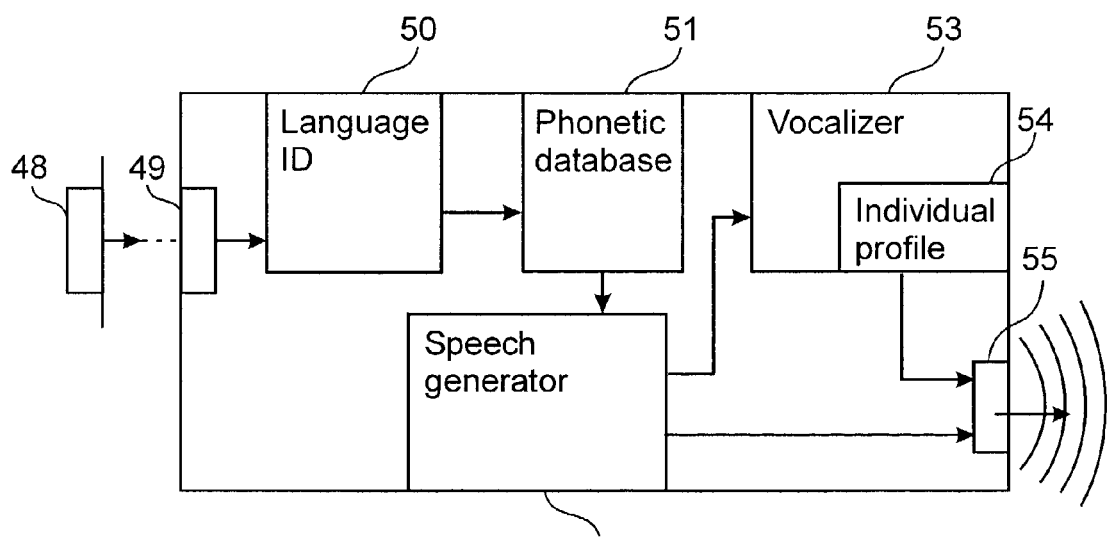
FIG. 4b shows the second part of the speech-to-text-to-speech system, i.e. the text-to-speech portion according to the other preferred embodiment of the present invention; and, FIG. 5 is a flow chart diagram of a method of on-line and real-time communicating.

The speech-to-text-to-speech system, according to another embodiment of the present invention is detailed in FIGS. 4a and 4b, wherein FIG. 4a shows the first part of the speech-to-text-to-speech system, i.e. the speech-to-text portion, whereas FIG. 4b shows the second part of the speech-to-text-to-speech system, i.e. the text-to-speech portion.

Referring to FIG. 4a, the speech to text portion of the system is in the form of a device including an input port 42 for receiving speech to transform, the input port 42 for connecting with the microphone 21 for example. The input port 42 is in communication with a language selector 43 and optionally with a speaker identifier 44. The purpose of the language selector 43 is to identify a language of the speech prior to a communication session. Language identification is provided at the beginning of the transmitted phonetic text in the form of ENG for English, FRA for French, ITA for Italian and so forth. Upon identifying a language, a phoneme database is selected from the database 45 such that only the phonemes corresponding to the identified language are used to translate the speech into a phonetic text by the text generator 46 in the form for example of a phonetic processor, which transcribes the phonemes into corresponding series of written characters such that a phonetic transcript of the original speech is generated. When the system comprises a speaker identifier 44, the speaker provides his name or any indication of his identity, which is then associated with the generated text before being transmitted. The phonetic transcript is modified at 47 in order to render it compatible for telecommunication transmission system and communicated to the output port 48 and transmitted out. As will be apparent to those of skill in the art, language dependent phonetic dictionaries allow for improved compression of the speech and for improved phoneme extraction. Alternatively, language and regional characteristics are used to select a phonetic dictionary such as Sco for Scottish English and Iri for Irish English in order to improve the phonetic dictionary for a particular accent or mode of speaking. Further alternatively, a speaker dependent phonetic dictionary is employed. Of course, it is preferable that a same dictionary is available at the receiving end for use in regenerating the speech in an approximately accurate fashion.

FIG. 4b is a bloc diagram of the second portion of the speech-to-text-to-speech system when a language is identified prior to a communication session. The transmitted phonetic text is received at input port 49 of the text-to-speech portion of the speech-to-text-to-speech system. The language of the phonetic text is identified by the language identifier 50, which allows selecting the phonemes corresponding to the identified language from a phonetic database 51. The speech generator 52 provides reconstituted speech based on the phonetic characters to an output port 55.

Advantageously, the identification of the language and the concomitant selection of the phonemes from the phonetic database improves a quality of the translation of the speech to a phonetic text. Similarly, upon receiving a phonetic text, an indication of the original language increases the quality of the restored speech.

Optionally, the system includes a vocalizer 53, which is in communication with the speech generator and integrates vocal parameters that are associated with the phonetic characters and provides to the output port sounds reflecting voice inflexion of the individual having spoken the original speech. When a speaker independent or language and region independent dictionary is used, the dictionary preferably includes vocal parameters to characterize such as tone, pitch, speed, gutteral quality, whisper, etc.

Further optionally, the system comprises a memory where vocal characteristics of a various people are stored. This is advantageous when the speaker and the listener know each other and each has a profile corresponding to the other stored in the memory. A profile associated to an individual comprises the individual's voice inflections, pitch, voice quality, and so forth. Upon receiving a phonetic text having an identification of the speaker, the individual profile corresponding to the speaker is extracted and combined to the vocal parameters associated with the received text. Thus, the reconstituted speech is declaimed using the speaker's vocal characteristics instead of a standard computerized voice.

Of course, once a dictionary is present and stored within a translating system, it is optional to have that system characterize speech received to identify the language/region/speaker in an automated fashion. Such speaker recognition is known in the art.

Figure 5:
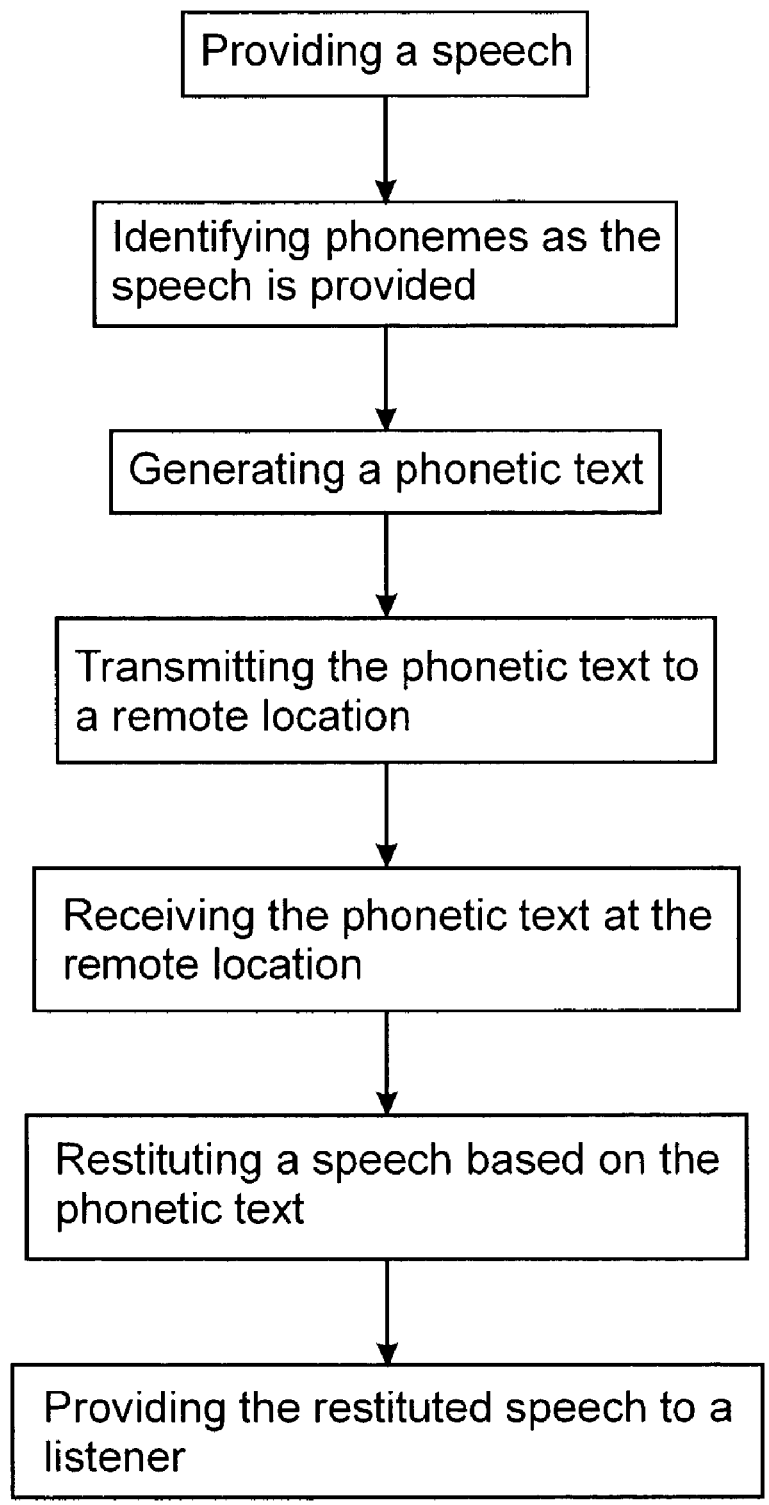

Referring to FIG. 5, a flow chart diagram of a method of using the speech-to-text-to-speech system is shown. An individual provides a speech to the system that breaks down the speech as it is provided to identify the phonemes in order to generate a text in a phonetic format. In a further step, the phonetic text is sent through an existing communication system to a computer system remotely located. The transmission of the phonetic text is a fast process especially using Internet connections, and the texts such sent are usually small files transmitted. Upon receiving the phonetic text, the speech generator on the remote computer system reconstitutes a speech based upon the phonetic system used.

Optionally, upon reaching a predetermined length of phonetic text, the phonetic text is transmitted such that the predetermined length of phonetic text is processed by the speech-to-text portion of the system to reduce the delay during a conversation.

In some languages, as for example, Chinese, same words have different meanings depending on their pronunciation. In these languages, the pronunciation is a limiting parameter. As is apparent to a person with skill in the art, the system is implementable such that the pronunciation of the phonemes reflects the meaning of words.

Numerous other embodiments may be envisaged without departing from the spirit or scope of the invention.

What is claimed is:

1. Speech-to-text-to-speech system comprising:
   a first input port for receiving a speech;
   a first processor in communication with the first input port, the first processor for identifying phonemes within the received speech and for encoding the phonemes into series of symbols compatible with communication systems, the series of symbols other than a known symbolic representation of the speech in a known language;
   a first output port in connection with the first processor, the first output port for transmitting the series of symbols;
   a second input port for receiving the series of symbols;
   a second processor in communication with the second input port, the second processor for decoding the series of symbols to restore the phonemes and for reconstituting speech according to the phonemes; and,
   a second output port for providing a signal indicative of the reconstituted speech,
   wherein the reconstituted speech is similar to the received speech.

2. A speech to text to speech system according to claim 1 comprising a transducer for communicating the reconstituted speech to a listening party.

3. A speech-to-text-to-speech system according to claim 2, comprising a first memory for storing phonetic database therein, the phonetic database including all phonemes of each of a plurality of languages.

4. A speech-to-text-to-speech system according to claim 3, comprising a second memory for storing at least a look-up table therein, the look-up table including symbols representative of the phonemes for encoding the phonemes into series of symbols compatible with communication systems and other than a known symbolic representation of the speech in a known language.

5. A speech-to-text-to-speech system according to claim 2, wherein the second processor comprises a voice generator for generating a signal, the signal, when provided to a speaker for resulting in the reconstituted speech.

6. A speech-to-text-to-speech system according to claim 5, comprising a third memory for storing voice profile of speakers for personalizing the reconstituted speech when generated.

7. A speech-to-text-to-speech system according to claim 2, wherein the first processor comprises a sound analyzer for identifying at least one of a pitch, a speed and a tone with which a phoneme is spoken and for associating a value indicative of a the pitch, speed and tone relative to a preset medium level.

8. A speech-to-text-to-speech system according to claim 2, wherein the first output port and the second input port are network connections for coupling with a wide area network.

9. A speech-to-text-to-speech system according to claim 8, wherein the second output port comprises a speaker.

10. A method of transmitting a speech on-line comprising the steps of:
    providing speech;
    identifying phonemes within the received speech;
    encoding the phonemes into series of symbols compatible with a communication system, the series of symbols other than a known symbolic representation of the speech in a known language;
    transmitting the series of symbols via a communication medium;
    receiving the series of symbols;
    decoding the series of symbols to provide a signal representative of the speech and including data reflective of the phonemes reconstituted to form reconstituted speech similar to the received speech.

11. A method according to claim 10 comprising the steps of:
    reconstituting a speech according to the signal; and,
    communicating the reconstituted speech to a listening party.

12. The method according to claim 11, wherein the step of providing a speech comprises the step of speaking into a microphone.

13. The method according to claim 11, wherein the step of communicating the reconstituted speech to a listening party comprises the step of providing the reconstituted speech to at least a speaker.

14. The method according to claim 11, wherein the step of encoding the phonemes into series of symbols comprises the step of:
    identifying a language of the speech;
    selecting from a phonetic database a look-up table from a plurality of different look-up tables and associated with the identified language;
    providing with a symbolic representation of the identified phonemes in accordance with the selected look-up table.

15. The method according to claim 14, wherein the step of decoding the series of symbols to restore the phonemes comprises the steps of:
    identifying the language of the provided speech;
    selecting from a phonetic database a look-up table from a plurality of different look-up tables and associated with the identified language;
    providing with a phonetic representation of the series of symbols in accordance with the selected look-up table.

16. The method according to claim 11, wherein the step of transmitting the series of symbols comprises the step of attaching the selected look-up table to the series of symbols.

17. The method according to claim 16, wherein the step of decoding the phonemes into series of symbols comprises the step of using the look-up table attached to the transmitted series of symbols.

18. The method according to claim 11, wherein the step of identifying phonemes within the received speech comprises the steps of:
    characterizing at least one voice related parameter; and,
    encoding a value indicative of the at least a voice related parameter in association with one or more phonemes.

19. The method according to claim 11, wherein the step of communicating the reconstituted speech to a listening party comprises the steps of:
    identifying a speaker;
    retrieved from a memory a voice profile of the speaker previously stored therein; and,
    reconstituting the speech using the retrieved voice profile.

20. The method according to claim 11, wherein the communication medium includes the Internet.

21. A speech-to-text-to-speech system comprising:
    means for providing speech;
    means for identifying phonemes within the received speech;
    means for encoding the phonemes into series of symbols compatible with a communication system, the series of symbols other than a known symbolic representation of the speech in a known language;
    means for transmitting the series of symbols via a communication medium;
    means for receiving the series of symbols;
    means for decoding the series of symbols to provide a signal representative of the speech and including data reflective of the phonemes reconstituted to form reconstituted speech similar to the received speech.

* * * * *